(12) United States Patent
Karkhanis

(10) Patent No.: US 10,841,271 B2
(45) Date of Patent: Nov. 17, 2020

(54) SYSTEMS, METHODS, AND MEDIA FOR CONTROLLING TRAFFIC TO INTERNET OF THINGS DEVICES

(71) Applicant: McAfee, LLC, Santa Clara, CA (US)

(72) Inventor: Sameer D. Karkhanis, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 16/357,678

(22) Filed: Mar. 19, 2019

(65) Prior Publication Data

US 2020/0304455 A1  Sep. 24, 2020

(51) Int. Cl.
*H04L 29/12* (2006.01)
*H04L 29/08* (2006.01)

(52) U.S. Cl.
CPC .......... *H04L 61/103* (2013.01); *H04L 67/12* (2013.01); *H04L 61/6022* (2013.01)

(58) Field of Classification Search
None
See application file for complete search history.

(56) References Cited

U.S. PATENT DOCUMENTS

| 6,603,769 B1 | 8/2003 | Thubert et al. | |
| 6,779,039 B1 * | 8/2004 | Bommareddy | ... H04L 29/12009 709/226 |
| 10,051,688 B1 * | 8/2018 | Huang | ............... H04W 52/0206 |
| 2004/0109472 A1 | 6/2004 | Choyi et al. | |

FOREIGN PATENT DOCUMENTS

| KR | 100535825 | 12/2005 |
| KR | 100876563 | 12/2008 |
| WO | 2015147793 | 10/2015 |

OTHER PUBLICATIONS

Proxy ARP. Posted at <https://www.cisco.com/c/en/us/support/docs/ip/dynamic-address-allocation-resolution/13718-5.html> on Jan. 28, 2008. (Year: 2008).*
Gratuitous ARP. Posted at <https://www.practicalnetworking.net/series/arp/gratuitous-arp/> on Jan. 23, 2017. (Year: 2017).*
International Search Report and Written Opinion dated Jul. 2, 2020 in International Patent Application No. PCT/US2020/023077, pp. 1-10.

* cited by examiner

*Primary Examiner* — Scott B Christensen
(74) *Attorney, Agent, or Firm* — Byrne Poh LLP

(57) ABSTRACT

Mechanisms for controlling traffic to an Internet of Things (IoT) device are provided, the mechanisms comprising: identifying a first IoT device having an Internet Protocol (IP) address and a Media Access Control (MAC) address; sending a first Address Resolution Protocol (ARP) broadcast on a local area network (LAN) indicating that the IP address of the first IoT device is to be associated with a MAC address of a router on the LAN; receiving first traffic on the LAN; extracting the IP Address of the first IoT device from the first traffic; determining that the first traffic is allowed; and forwarding the first traffic to the first IoT device by inserting the MAC address of the first IoT device in the first traffic and re-broadcasting the first traffic.

18 Claims, 4 Drawing Sheets

SYSTEMS, METHODS, AND MEDIA FOR CONTROLLING TRAFFIC TO INTERNET OF THINGS DEVICES

BACKGROUND

Typically, modern routers manage layer 2 of the seven-layer Open System Interconnection networking reference model using a system-on-a-chip (SoC). Usually, traffic is Ethernet traffic and Ethernet broadcasts do not reach a router's software stack unless a frame is destined for the router. This makes it very hard to detect an infected device spreading infections inside a user's home network (or local area network (LAN)).

Accordingly, there is a need for new systems, methods, and media for controlling traffic to IoT devices.

SUMMARY

In accordance with some embodiments, systems, methods, and media for controlling traffic to IoT devices are provided. In some embodiments, systems for controlling traffic to Internet of Things (IoT) devices are provided, the systems comprising: a memory; and a hardware processor coupled to the memory and configured to: identify a first IoT device having an Internet Protocol (IP) address and a Media Access Control (MAC) address; send a first Address Resolution Protocol (ARP) broadcast on a local area network (LAN) indicating that the IP address of the first IoT device is to be associated with a MAC address of a router on the LAN; receive first traffic on the LAN; extract the IP Address of the first IoT device from the first traffic; determine that the first traffic is allowed; and forward the first traffic to the first IoT device by inserting the MAC address of the first IoT device in the first traffic and re-broadcasting the first traffic.

In some embodiments, methods for controlling traffic to an Internet of Things (IoT) device are provided, the methods comprising: identifying a first IoT device having an Internet Protocol (IP) address and a Media Access Control (MAC) address; sending a first Address Resolution Protocol (ARP) broadcast on a local area network (LAN) indicating that the IP address of the first IoT device is to be associated with a MAC address of a router on the LAN; receiving first traffic on the LAN; extracting the IP Address of the first IoT device from the first traffic; determining that the first traffic is allowed; and forwarding the first traffic to the first IoT device by inserting the MAC address of the first IoT device in the first traffic and re-broadcasting the first traffic.

In some embodiments, non-transitory computer-readable media containing computer executable instructions that, when executed by a processor, cause the processor to perform a method for controlling traffic to an Internet of Things (IoT) device are provided, the method comprising: identifying a first IoT device having an Internet Protocol (IP) address and a Media Access Control (MAC) address; sending a first Address Resolution Protocol (ARP) broadcast on a local area network (LAN) indicating that the IP address of the first IoT device is to be associated with a MAC address of a router on the LAN; receiving first traffic on the LAN; extracting the IP Address of the first IoT device from the first traffic; determining that the first traffic is allowed; and forwarding the first traffic to the first IoT device by inserting the MAC address of the first IoT device in the first traffic and re-broadcasting the first traffic.

DETAILED DESCRIPTION

In accordance with some embodiments, mechanisms (which can include systems, methods, and media) for controlling traffic to Internet of Things (IoT) devices are provided.

In some embodiments, these mechanisms can identify IoT devices and make ARP broadcasts indicating the IoT devices are to be associated with a MAC address of the router. Then when traffic has the MAC address of the router, the traffic can be received and it can be determined whether the traffic is intended for the router or an IoT device. If the traffic is intended for the router, then the traffic can be forward to the router. Otherwise, if the traffic is destined for an IoT device, one or more security rules can be retrieved for the IoT device and the rules followed to either: (1) drop the traffic; or (2) replace the router's MAC address with the IoT device's MAC address and forward the traffic to the IoT device.

Figure 1:
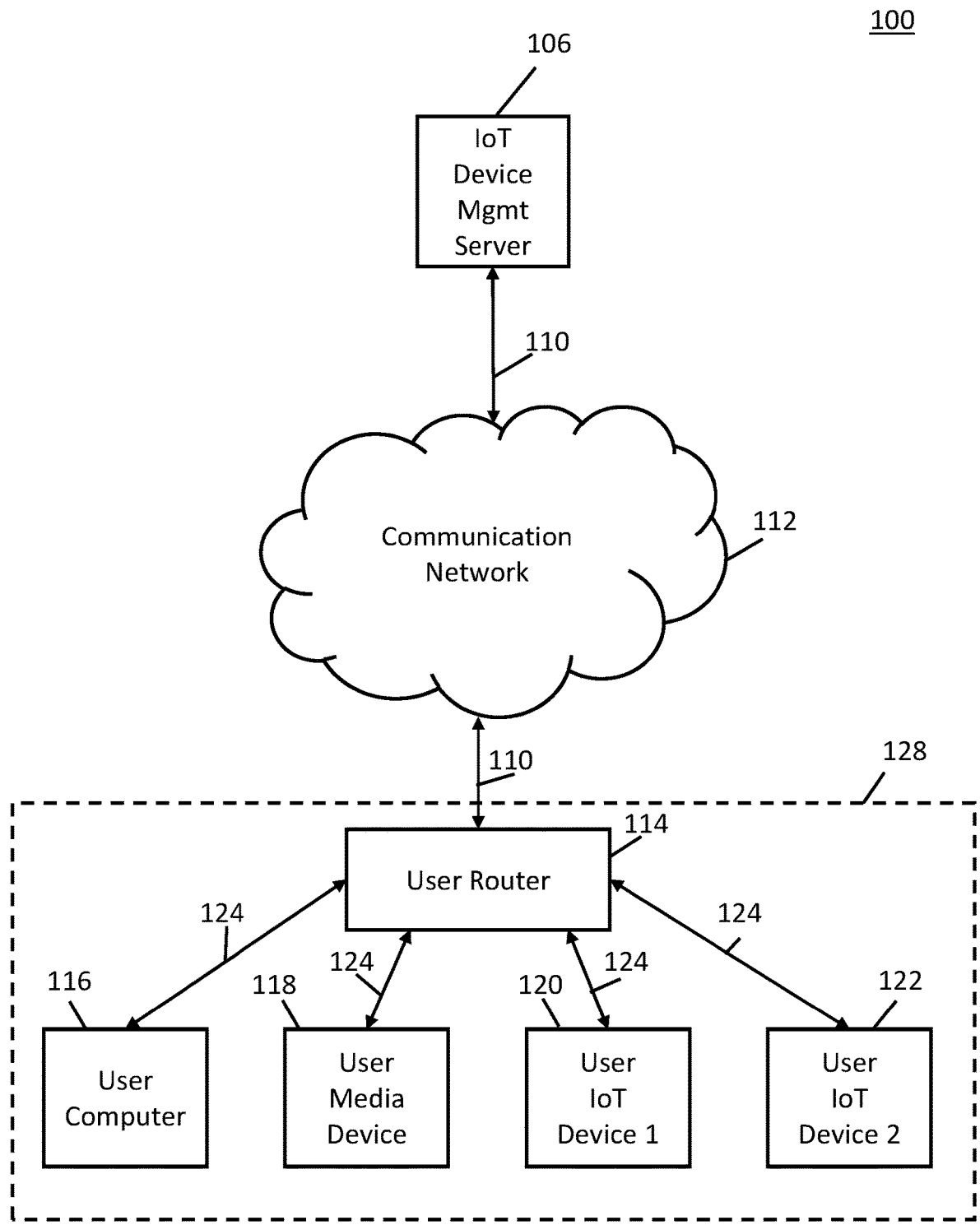
FIG. 1 illustrates an example of hardware that can be used in accordance with some embodiments.

Turning to FIG. 1, an example 100 of hardware for controlling traffic to Internet of Things (IoT) devices in accordance with some embodiments of the disclosed subject matter is shown. As illustrated, hardware 100 can include an IoT device management server 106, a communication network 112, a user router 114, a user computer 116, a user media device 118, and user Internet-of-Things (IoT) devices 120 and 122.

IoT device management server 106 can be any suitable server for managing IoT devices. For example, in some embodiments, IoT device management server 106 can be any server for managing IoT devices and can perform any suitable functions.

Communication network 112 can be any suitable combination of one or more wired and/or wireless networks in some embodiments. For example, in some embodiments, communication network 112 can include any one or more of the Internet, a mobile data network, a satellite network, a local area network, a wide area network, a telephone network, a cable television network, a WiFi network, a WiMax network, and/or any other suitable communication network.

In some embodiments, communication network 112 and the devices connected to it can form or be part of a wide area network (WAN).

IoT device management server 106 and user router 114 can be connected by one or more communications links 110 to communication network 112. The communications links can be any communications links suitable for communicating data among IoT device management server 106, user router 114, and communication network 112, such as network links, dial-up links, wireless links, hard-wired links, any other suitable communications links, or any suitable combination of such links.

User router 114 can be any suitable router. For example, in some embodiments, user router 114 can be any router for routing traffic between user computer 116, user media device 118, user Internet-of-Things (IoT) devices 120 and 122, and/or the Internet, and can perform any suitable functions such as processes 300 of FIG. 3 and process 400 of FIG. 4.

User computer 116 can be any suitable computer, such as a desktop computer, a laptop computer, a tablet computer, a smart phone, and/or any other suitable computer device, and can perform any suitable functions.

User media device 118 can be any suitable device for streaming media, such as a media player box, a media player dongle (which can stream video and audio, video only, or audio only), a smart television, etc.

User IoT devices 120 and 122 can be any suitable Internet of Things devices, such as internet protocol cameras, smart smoke alarms, smart thermostats, smart locks, alarms, sensors, light bulbs, hubs, smart speakers, and/or any other device that can be connected to a computer network.

User computer 116, user media device 118, and user IoT devices 120 and 122 can be connected by one or more communications links 124 to user router 114. The communications links can be any communications links suitable for communicating data among user computer 116, user media device 118, user IoT devices 120 and 122, user router 114, such as network links, dial-up links, wireless links, hard-wired links, any other suitable communications links, or any suitable combination of such links.

In some embodiments, user computer 116, user media device 118, user IoT devices 120 and 122, communications links 124, and user router 114 can form or be part of a local area network 128.

Although one IoT device management server 106, one user router 114, one user computer 116, one user media device 118, and two user IoT devices 120 and 122 are shown in FIG. 1 to avoid over-complicating the figure, any suitable numbers (including zero in some embodiments) of these devices can be used in some embodiments.

Figure 2:
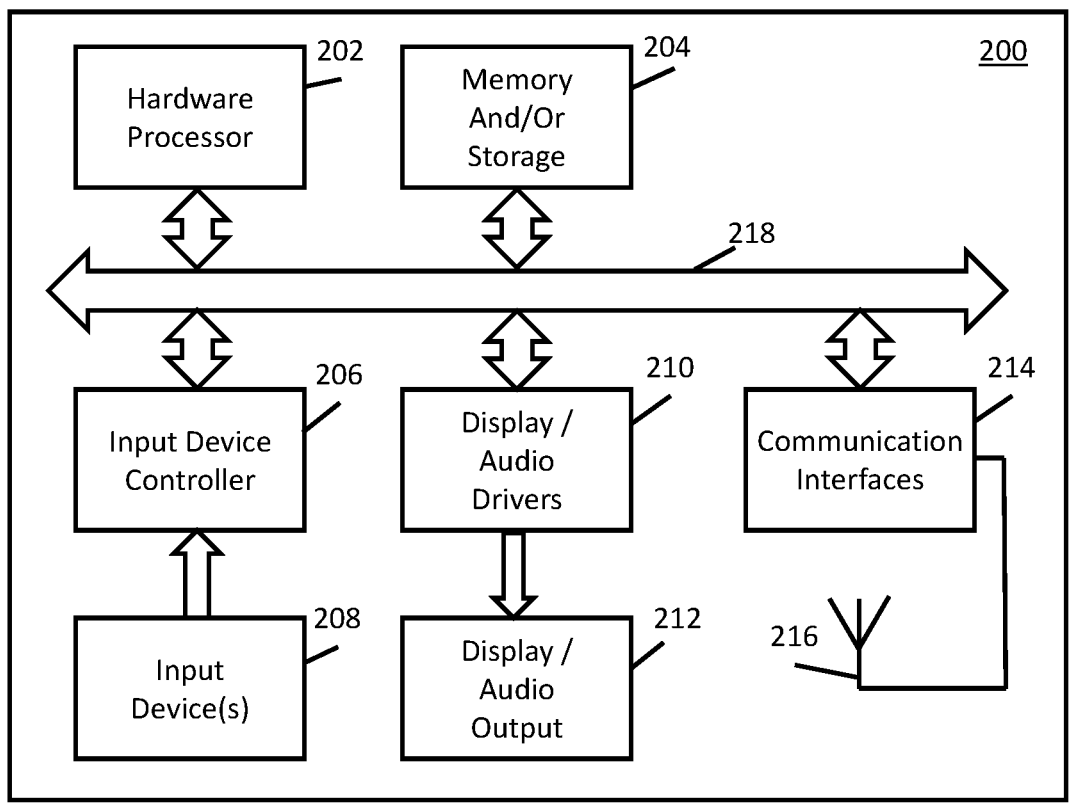
FIG. 2 illustrates a more particular example of hardware that can be used for certain components of the hardware of FIG. 1 in accordance with some embodiments.

IoT device management server 106, user router 114, user computer 116, user media device 118, and/or user IoT devices 120 and 122 can be implemented using any suitable hardware in some embodiments. For example, in some embodiments, IoT device management server 106, user router 114, user computer 116, user media device 118, and/or user IoT devices 120 and 122 can be implemented using any suitable general-purpose computer or special-purpose computer. For example, a user IoT device, such as a smart lock or smart camera, can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from a device in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 112 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can additionally or alternatively be included in hardware 200 in accordance with some embodiments.

Figure 3:
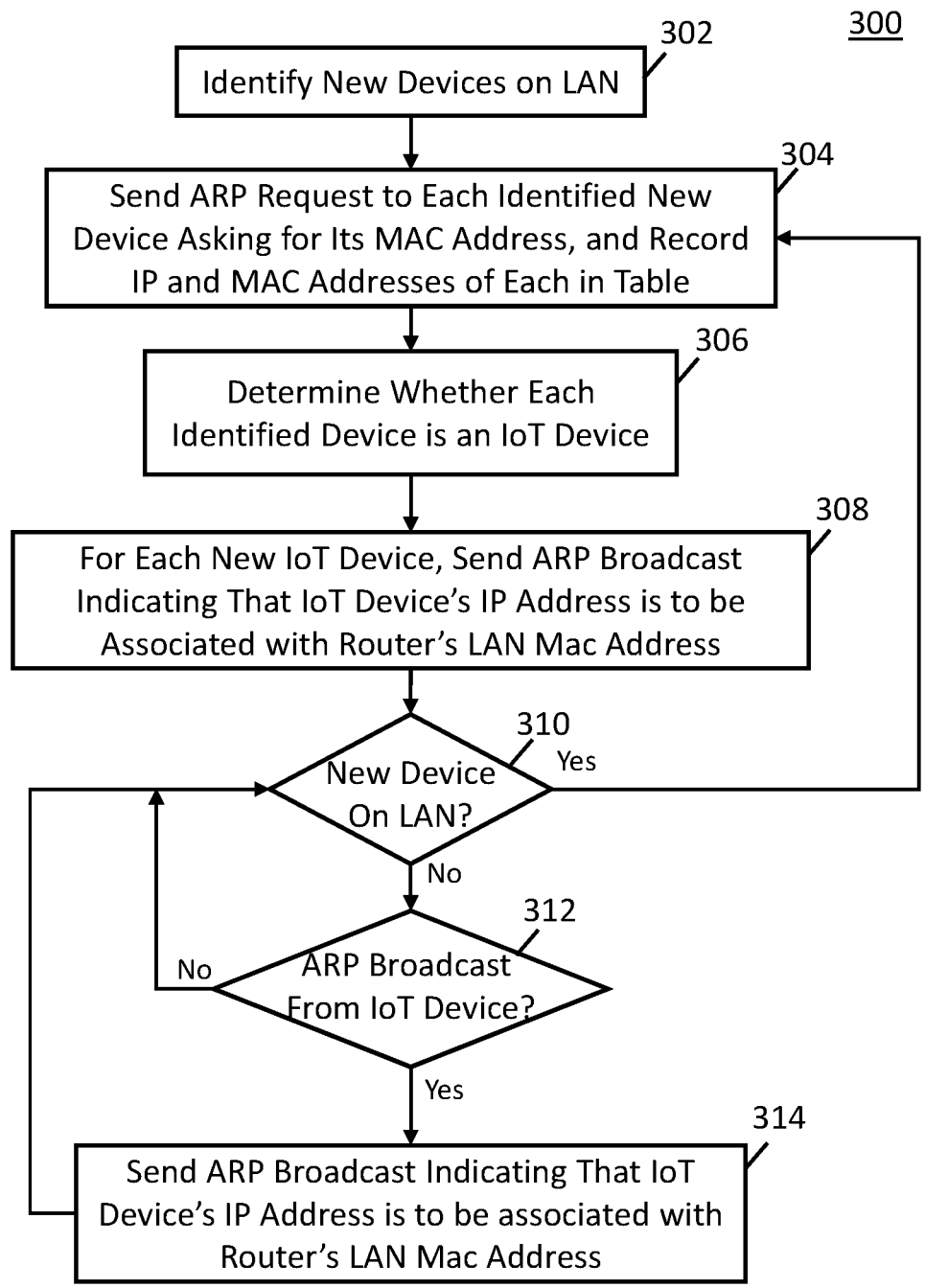
FIG. 3 illustrates an example of a process for associating IoT devices with a router's media access control (MAC) address in accordance with some embodiments.

Turning to FIG. 3, an illustration of an example 300 of a process for associating IoT devices with a router's media access control (MAC) address that can be performed in accordance with some embodiments is shown. Process 300 can be executed by user router 114 in some embodiments.

As shown, process 300 begins by identifying one or more new devices on a local area network (LAN) at 302. The devices can be identified in any suitable manner. For example, in some embodiments, devices can be identified by referencing a list of internet protocol (IP) addresses maintained by a dynamic host configuration protocol (DHCP) server that is running in user router 114. A device can be considered to be new when a current instance of process 300 has not previously fingerprinted the device (as described below in connection with 306) in some embodiments.

Next, at 304, process 300 can send an address resolution protocol (ARP) request to each identified new device asking for its MAC address, receive corresponding ARP response(s) containing the requested MAC address(es), and record the IP address and the MAC address for each device in a table. The ARP requests can be sent in any suitable manner, the ARP response can be received in any suitable manner, and the IP and MAC addresses can be stored in any suitable manner, in some embodiments.

Then at 306, process 300 can determine whether each device is an IoT device. This determination can be made in any suitable manner in some embodiments. For example, in some embodiments, process 300 can determine that any device that is not a desktop computer, laptop computer, tablet computer, or mobile phone is an IoT device. As another example, in some embodiments, process 300 can determine that a device is an IoT device by fingerprinting the device. More particularly, for example, a fingerprint of a device identify the type, manufacturer, model, operating systems, operating system version, firmware version, and/or any other suitable identifying information for a device, and the fingerprint can be taken by identifying trait(s) of the device such as MAC address(es) of the device, a host name associated with the device, the device's responses to network discovery probes (e.g., UpnP, MDNS (Bonjour), NetBIOS, and SNMP), open ports on the device, user agents used by the device, DNS requests made by the device, DHCP vendor and vendor options used by the device, and network characteristics (e.g., domains visited, content of packets sent/received, interpacket arrival rate, TTL, etc.) of the device, and/or any other observable trait(s) of the device or a combination of the traits mentioned above. These traits can then be compared to a database of traits for desktop computers, laptop computers, tablet computers, and mobile phones to determine that a device is an IoT device when no match is found or to a database of traits for IoT devices to determine that a device is an IoT device when a match is found.

Next, at 308, process 300 can send, for each IoT device identified at 306, an address resolution protocol (ARP) broadcast indicating that the IoT device's internet protocol (IP) address is to be associated with user router 114's LAN MAC address. This ARP broadcast can be sent in any suitable manner and have any suitable content.

Then, at 310, process 300 can determine whether there is a new device on the LAN. This determination can be made in any suitable manner, such as that described above in connection with 302. If so, process 300 can loop back to 304.

Otherwise, process 300 can branch to 312, at which process 300 can determine whether an ARP broadcast has been received from one of the IoT devices. This determination can be made in any suitable manner. If process 300 determines that an ARP broadcast has not been received from one of the IoT devices at 312, then process 300 can loop back to 310.

Otherwise, at 312, process 300 can send an ARP broadcast indicating that the IoT device's internet protocol (IP) address is to be associated with user router 114's LAN MAC address. This ARP broadcast can be sent in any suitable manner and can have any suitable content. After sending the ARP broadcast at 314, process 300 can loop back to 310.

Figure 4:
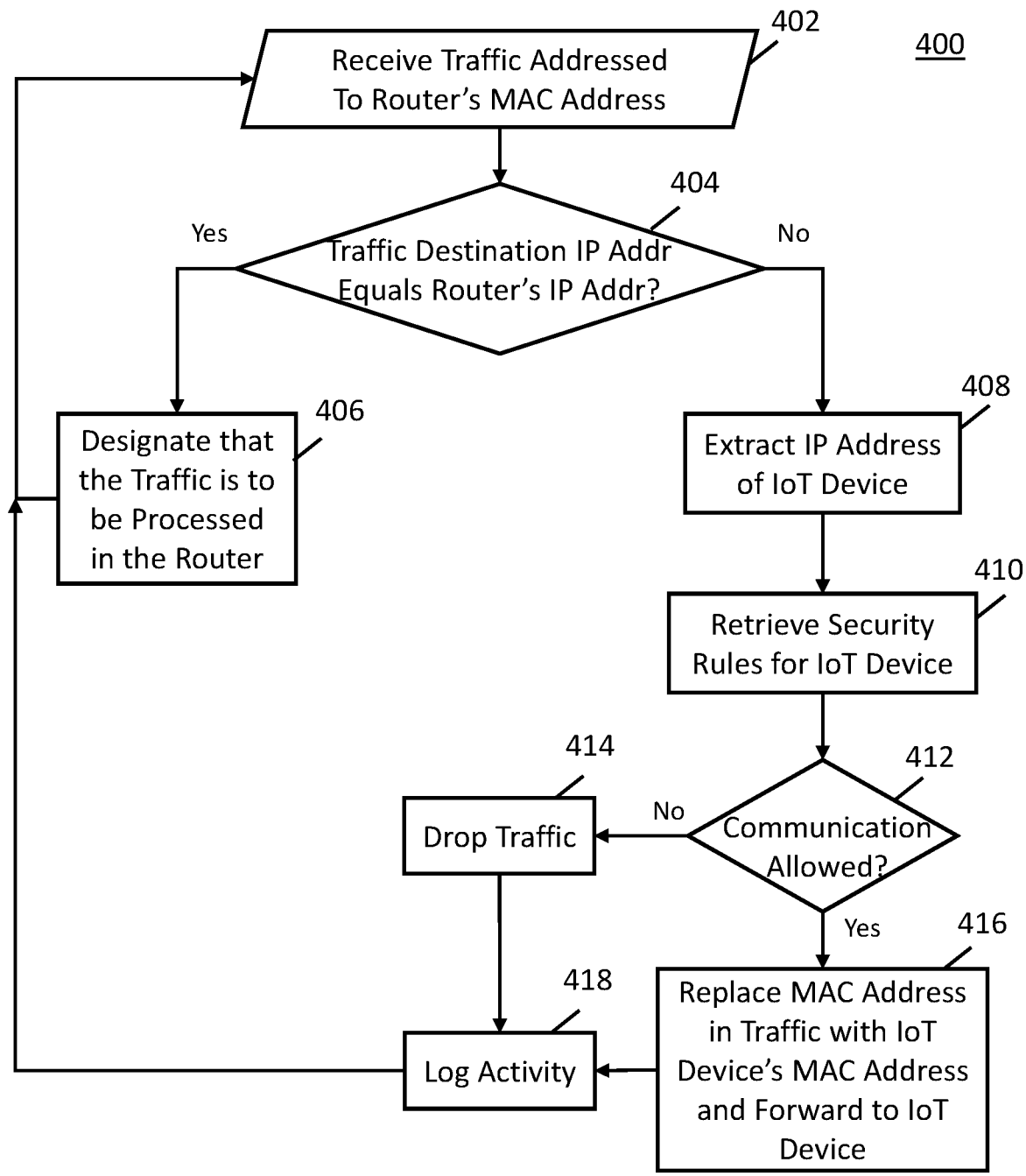
FIG. 4 illustrates an example of a process for controlling traffic to IoT devices in accordance with some embodiments.

Turning to FIG. 4, an illustration of an example 400 of a process for controlling traffic to Internet of Things (IoT) devices in accordance with some embodiments is shown. In some embodiments, process 400 can be performed by user router 114.

As illustrated, process 400 begin by receiving traffic on the LAN that is addressed to the router's MAC address at 402. This traffic can be received in any suitable manner.

Next, at 404, process 400 can determine whether the traffic has a destination IP address equal to the router's IP address. This determination can be made in any suitable manner.

If it is determined at 404 that the traffic has a destination IP address equal to the router's IP address, then process 400 can designate that the traffic is to be processed in the router at 406 and then loop back to 402. Process 400 can designate that the traffic is to be processed in the router at 406 in any suitable manner in some embodiments, and, in response, the router can process the traffic in any suitable manner.

Otherwise, if it is determined at 404 that the traffic does not have a destination IP address equal to the router's IP address, then process 400 can branch to 408 at which it can extract the IP address of an IoT device to which the traffic is intended to go. The IP address can be extracted in any suitable manner in some embodiments.

Next, at 410, process 400 can retrieve one or more security rules for the IoT device. The security rule(s) can be retrieved in any suitable manner. For example, the security rule(s) can be retrieved from memory of the router in some embodiments. As another example, in some embodiments, the security rule(s) can be retrieved from IoT device management server 106.

Then, at 412, process 400 can determine whether communication with the IoT device is allowed. This determination can be made in any suitable manner. For example, in some embodiments, this determination can be made based on the security rule(s) retrieved at 410.

If it is determined at 412 that communication with the IoT device is not allowed, then, at 414, process 400 can drop the traffic. The traffic can be dropped in any suitable manner in some embodiments.

Otherwise, if it is determined at 412 that communication with the IoT device is allowed, then, at 416, process 400 can replace the router's MAC address in the traffic with the MAC address for the IoT device identified at 408 and forward the traffic to the IoT device. This replacement and forwarding can be performed in any suitable manner. For example, in some embodiments, process 400 can forward the traffic to the IoT device by re-broadcasting the L2 Ethernet frame after inserting the IoT device's original MAC in the frame.

After dropping the traffic at 414 or forwarding the traffic at 416, process 400 can log the activity at 418 and loop back to 402.

It should be understood that at least some of the above described blocks of the processes of FIGS. 3 and 4 can be executed or performed in any order or sequence not limited to the order and sequence shown in and described in the figures. Also, some of the above blocks of the processes of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, systems, methods, and media for controlling traffic to Internet of Things (IoT) devices are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A router for controlling traffic to an Internet of Things (IoT) device on a local area network (LAN), comprising:

a memory; and
a hardware processor coupled to the memory and configured to:
  identify a first IoT device having an Internet Protocol (IP) address and a Media Access Control (MAC) address;
  send an Address Resolution Protocol (ARP) request to the first IoT device;
  receive a response to the ARP request;
  determine that the first IoT device is an IoT device based on the response;
  in response to determining that the first IoT device is an IoT device, send a first ARP broadcast on the LAN indicating that the IP address of the first IoT device is to be associated with a MAC address of the router;
  receive first traffic on the LAN, the first traffic including a MAC address of the router;
  extract the IP Address of the first IoT device from the first traffic and identifying that the first traffic is for the first IoT device based on the extracted IP address;
  determine that the first traffic is allowed; and
  forward the first traffic to the first IoT device by:
    replacing the MAC address of the router with the MAC address of the first IoT device in the first traffic; and
    sending the first traffic with the MAC address of the first IoT device to the first IoT device.

2. The router of claim 1, wherein the hardware processor is further configured to detect a second ARP broadcast on the LAN from a second IoT device and, in response to detecting the second ARP broadcast, send a third ARP broadcast on the LAN indicating that an IP address of the second IoT device is to be associated with the MAC address of the router.

3. The router of claim 1, wherein the hardware processor is further configured to:
  receive second traffic on the LAN;
  determine that the second traffic has a destination address that is equal to an IP address of the router; and
  designate that the second traffic is to be processed by the router.

4. The router of claim 1, wherein the hardware processor is further configured to:
  receive third traffic on the LAN;
  extract the IP Address of the first IoT device from the third traffic;
  determine that the third traffic is not allowed; and
  drop the third traffic.

5. The router of claim 4, wherein the hardware processor is further configured to log that the third traffic was dropped.

6. The router of claim 1, wherein the hardware processor is further configured to retrieve security rules for the first IoT device, wherein the determining that the first traffic is allowed based on the security rules.

7. A method for controlling traffic to an Internet of Things (IoT) device on a local area network (LAN), comprising:
  identifying a first IoT device having an Internet Protocol (IP) address and a Media Access Control (MAC) address by a hardware process of a router on the LAN;
  sending an Address Resolution Protocol (ARP) request to the first IoT device using the hardware processor of the router;
  receiving a response to the ARP request;
  determining that the first IoT device is an IoT device using the hardware processor based on the response;
  in response to determining that the first IoT device is an IoT device, sending a first ARP broadcast on the LAN indicating that the IP address of the first IoT device is to be associated with a MAC address of the router using the hardware processor;
  receiving first traffic on the LAN, the first traffic including a MAC address of the router;
  extracting the IP Address of the first IoT device from the first traffic and identifying that the first traffic is for the first IoT device based on the extracted IP address;
  determining that the first traffic is allowed; and
  forwarding the first traffic to the first IoT device by:
    replacing the MAC address of the router with the MAC address of the first IoT device in the first traffic; and
    sending the first traffic with the MAC address of the first IoT device to the first IoT device.

8. The method of claim 7, further comprising detecting a second ARP broadcast on the LAN from a second IoT device and, in response to detecting the second ARP broadcast, sending a third ARP broadcast on the LAN indicating that an IP address of the second IoT device is to be associated with the MAC address of the router.

9. The method of claim 7, further comprising:
  detecting second traffic on the LAN;
  determining that the second traffic has a destination address that is equal to an IP address of the router; and
  passing the second traffic to the router.

10. The method of claim 7, further comprising:
  detecting third traffic on the LAN;
  extracting the IP Address of the first IoT device from the third traffic;
  determining that the third traffic is not allowed; and
  dropping the third traffic.

11. The method of claim 10, further comprising logging that the third traffic was dropped.

12. The method of claim 7, further comprising retrieving security rules for the first IoT device, wherein the determining that the first traffic is allowed based on the security rules.

13. A non-transitory computer-readable medium containing computer executable instructions that, when executed by a hardware processor of a router, cause the processor to perform a method for controlling traffic to an Internet of Things (IoT) device on a local area network (LAN), the method comprising:
  identifying a first IoT device having an Internet Protocol (IP) address and a Media Access Control (MAC) address;
  sending an Address Resolution Protocol (ARP) request to the first IoT device;
  receiving a response to the ARP request;
  determining that the first IoT device is an IoT device based on the response;
  in response to determining that the first IoT device is an IoT device, sending a first ARP broadcast on the LAN indicating that the IP address of the first IoT device is to be associated with a MAC address of the router;
  receiving first traffic on the LAN, the first traffic including a MAC address of the router;
  extracting the IP Address of the first IoT device from the first traffic and identifying that the first traffic is for the first IoT device based on the extracted IP address;
  determining that the first traffic is allowed; and
  forwarding the first traffic to the first IoT device by:
    replacing the MAC address of the router with the MAC address of the first IoT device in the first traffic; and
    sending the first traffic with the MAC address of the first IoT device to the first IoT device.

14. The non-transitory computer-readable medium of claim 13, the method further comprising detecting a second ARP broadcast on the LAN from a second IoT device and, in response to detecting the second ARP broadcast, sending a third ARP broadcast on the LAN indicating that an IP address of the second IoT device is to be associated with the MAC address of the router.

15. The non-transitory computer-readable medium of claim 13, the method further comprising:
   detecting second traffic on the LAN;
   determining that the second traffic has a destination address that is equal to an IP address of the router; and
   passing the second traffic to the router.

16. The non-transitory computer-readable medium of claim 13, the method further comprising:
   detecting third traffic on the LAN;
   extracting the IP Address of the first IoT device from the third traffic;
   determining that the third traffic is not allowed; and
   dropping the third traffic.

17. The non-transitory computer-readable medium of claim 16, the method further comprising logging that the third traffic was dropped.

18. The non-transitory computer-readable medium of claim 13, the method further comprising retrieving security rules for the first IoT device, wherein the determining that the first traffic is allowed based on the security rules.

* * * * *